United States Patent
Rao et al.

(10) Patent No.: US 12,159,168 B2
(45) Date of Patent: Dec. 3, 2024

(54) RESOURCE ORCHESTRATION FOR MICROSERVICES-BASED 5G APPLICATIONS

(71) Applicant: NEC Laboratories America, Inc., Princeton, NJ (US)

(72) Inventors: Kunal Rao, Monroe, NJ (US); Wang-Pin Hsiung, Santa Clara, CA (US); Oliver Po, San Jose, CA (US); Murugan Sankaradas, Dayton, NJ (US); Srimat Chakradhar, Manalapan, NJ (US); Anousheh Gholami, College Park, MD (US)

(73) Assignee: NEC Corporation, Tokyo (JP)

( * ) Notice: Subject to any disclaimer, the term of this patent is extended or adjusted under 35 U.S.C. 154(b) by 324 days.

(21) Appl. No.: 17/863,685

(22) Filed: Jul. 13, 2022

(65) Prior Publication Data

US 2023/0035024 A1    Feb. 2, 2023

Related U.S. Application Data

(60) Provisional application No. 63/241,149, filed on Sep. 7, 2021, provisional application No. 63/221,870, filed on Jul. 14, 2021.

(51) Int. Cl.
*G06F 9/50* (2006.01)
*H04W 4/60* (2018.01)
*H04W 24/02* (2009.01)

(52) U.S. Cl.
CPC ............ *G06F 9/5038* (2013.01); *H04W 4/60* (2018.02); *H04W 24/02* (2013.01)

(58) Field of Classification Search
CPC ........ G06F 9/5038; H04W 4/60; H04W 24/02
See application file for complete search history.

(56) References Cited

U.S. PATENT DOCUMENTS

2023/0035024 A1* 2/2023 Rao .................... H04W 24/04
2023/0038943 A1* 2/2023 Yang ................... H04W 48/20
(Continued)

FOREIGN PATENT DOCUMENTS

CN    112348369 B  *  3/2024  ....... G06Q 10/06312
CN    116321300 B  *  6/2024  ........ H04W 28/0925
(Continued)

OTHER PUBLICATIONS

Al-Tarawne et al., "Performance Assessment of Context-aware Online Learning for Task Offloading in Vehicular Edge Computing Systems", International Journal of Advanced Computer Science and Applications, vol. 12, No. 4, May 2021, pp. 304-320.
(Continued)

*Primary Examiner* — Adam D Houston
(74) *Attorney, Agent, or Firm* — Joseph Kolodka

(57) ABSTRACT

A method for performing resource orchestration for microservices-based 5G applications in a dynamic, heterogenous, multi-tiered compute and network environment is presented. The method includes managing compute requirements and network requirements of a microservices-based application jointly by positioning computing nodes distributed across multiple layers, across edges and at a central cloud, identifying and modeling coupling relationships between compute and network resources for a plurality of microservices, when only application-level requirements are provided, to build coupling functions, solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices, and deriving optimal joint network and
(Continued)

compute resource allocation and function placement decisions.

20 Claims, 9 Drawing Sheets

(56) References Cited

U.S. PATENT DOCUMENTS

| | | | | |
|---|---|---|---|---|
| 2024/0129801 A1* | 4/2024 | Zaifman | ............ | H04W 28/0268 |
| 2024/0187071 A1* | 6/2024 | Li | ............ | H04W 24/10 |
| 2024/0205654 A1* | 6/2024 | Naik | ............ | H04W 24/02 |
| 2024/0224147 A1* | 7/2024 | Lee | ............ | H04W 36/142 |
| 2024/0250887 A1* | 7/2024 | Yao | ............ | H04L 43/04 |

FOREIGN PATENT DOCUMENTS

| | | | |
|---|---|---|---|
| JP | 7511765 B2 | * | 7/2024 |
| WO | WO-2024097717 A1 | * | 5/2024 |

OTHER PUBLICATIONS

Gholami et al., "Collaborative Cloud-Edge-Local Computation Offloading for Multi-Component Applications", In 2021 IEEE/ACM Symposium on Edge Computing (SEC), Dec. 1, 20214, pp. 361-365.

Esper et al., "eXP-RAN—An Emulator for Gaining Experience With Radio Access Networks, Edge Computing, and Slicing", IEEE Access, 8, Aug. 2020, pp. 152975-152989.

Liu et al., "DIRECT: Distributed Cross-Domain Resource Orchestration in Cellular Edge Computing", In Proceedings of the Twentieth ACM International Symposium on Mobile Ad Hoc Networking and Computing, Jul. 2, 2019, pp. 181-190.

Sonmez et al., "Machine Learning-Based Workload Orchestrator for Vehicular Edge Computing", IEEE Transactions on Intelligent Transportation Systems, vol. 22, No. 4, Apr. 2020, pp. 2239-2251.

Rao et al., "ECO: Edge-Cloud Optimization of 5G applications", arXiv:2109.01201v1 [cs.DC], Sep. 2, 2021, pp. 1-11.

Ray et al., "Proactive Microservice Placement and Migration for Mobile Edge Computing", In 2020 IEEE/ACM Symposium on Edge Computing (SEC), Nov. 1, 20202, pp. 28-41.

D'Oro et al., "SI-EDGE: Network Slicing at the Edge", arXiv:2005.00886v1 [cs.NI], May 2, 2020, pp. 1-11.

Sonmez et al., "EdgeCloudSim: An Environment for Performance Evaluation of Edge Computing Systems", Transactions on Emerging Telecommunications Technologies, Nov. 2018, pp. 1-6.

Torkzaban et al., "Trust-Aware Service Function Chain Embedding: A Path-Based Approach", arXiv:2009.07343v2 [cs.NI], Oct. 5, 2020, pp. 1-6.

Torkzaban et al., "Trust-Aware Service Chain Embedding", In 2019 Sixth International Conference on Software Defined Systems (SDS), Jun. 10, 2019, pp. 242-247.

* cited by examiner

RESOURCE ORCHESTRATION FOR MICROSERVICES-BASED 5G APPLICATIONS

RELATED APPLICATION INFORMATION

This application claims priority to Provisional Application No. 63/221,870 filed on Jul. 14, 2021, and Provisional Application No. 63/241,149 filed on Sep. 7, 2021, the contents of both of which are incorporated herein by reference in their entirety.

BACKGROUND

Technical Field

The present invention relates to 5G and edge computing applications and, more particularly, to resource orchestration for microservices-based 5G applications.

Description of the Related Art

With the growth of 5G, Internet of Things (IoT), edge computing and cloud computing technologies, the infrastructure (compute and network) available to emerging applications (Augmented Reality (AR), Virtual Reality (VR), autonomous driving, industry 4.0, etc.) has become quite complex. There are multiple tiers of computing (IoT devices, near edge, far edge, cloud, etc.) that relate to different types of networking technologies (LAN, LTE, 5G, MAN, WAN, etc.). Deployment and management of applications in such an environment is challenging.

SUMMARY

A method for performing resource orchestration for microservices-based 5G applications in a dynamic, heterogenous, multi-tiered compute and network environment is presented. The method includes managing compute requirements and network requirements of a microservices-based application jointly by positioning computing nodes distributed across multiple layers, across edges and at a central cloud, identifying and modeling coupling relationships between compute and network resources for a plurality of microservices, when only application-level requirements are provided, to build coupling functions, solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices, and deriving optimal joint network and compute resource allocation and function placement decisions.

A non-transitory computer-readable storage medium comprising a computer-readable program for performing resource orchestration for microservices-based 5G applications in a dynamic, heterogenous, multi-tiered compute and network environment is presented. The computer-readable program when executed on a computer causes the computer to perform the steps of managing compute requirements and network requirements of a microservices-based application jointly by positioning computing nodes distributed across multiple layers, across edges and at a central cloud, identifying and modeling coupling relationships between compute and network resources for a plurality of microservices, when only application-level requirements are provided, to build coupling functions, solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices, and deriving optimal joint network and compute resource allocation and function placement decisions.

A system for performing resource orchestration for microservices-based 5G applications in a dynamic, heterogenous, multi-tiered compute and network environment is presented. The system includes a memory and one or more processors in communication with the memory configured to manage compute requirements and network requirements of a microservices-based application jointly by positioning computing nodes distributed across multiple layers, across edges and at a central cloud, identifying and modeling coupling relationships between compute and network resources for a plurality of microservices, when only application-level requirements are provided, to build coupling functions, solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices, and deriving optimal joint network and compute resource allocation and function placement decisions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The fifth generation (5G) of mobile network promises to support a wide range of Internet-of-Things (IoT) services requesting strict and diverse set of requirements in terms of end-to-end latency, throughput, reliability, etc. To accommodate these services automatically and at large scale, network slicing has emerged as an evolutionary solution for the design and deployment of the next generation mobile networks, enabled by the programmability and flexibility that Software Defined Networking (SDN) and Network Function Virtualization (NFV) technologies introduce into the future network management systems. A Network Slice (NS), in the context of 5G, is composed of sub-slices encompassing the Radio Access Network (RAN), Core Network (CN) and the transport network. 3GPP has put efforts into integrating network slicing in the future specification of both RAN and CN domains. Despite significant benefits that network slicing has demonstrated to bring into the mobile network systems management and performance, the real-time response required by the delay sensitive applications, such as autonomous driving, video analytics and streaming applications, necessitates the integration of Multi-access Edge Computing (MEC) into 5G networks and beyond. The aim of MEC is to push different resources from the remote central cloud to the network edge in close vicinity of users and IoT sensors, where data is generated.

Prior to MEC, Mobile Cloud Computing (MCC) became a key technology to realize computationally intensive applications by offloading substantial amounts of mobile device computing functionality to a remote cloud data center. Compared to MCC, MEC has lower latency, but it can easily become overloaded. Thus, a multi-tiered computing and networking system where critical services are offloaded to MEC and the delay-tolerant services are computed at the remote cloud has the potential to improve application performance and overall resource utilization.

Figure 1:
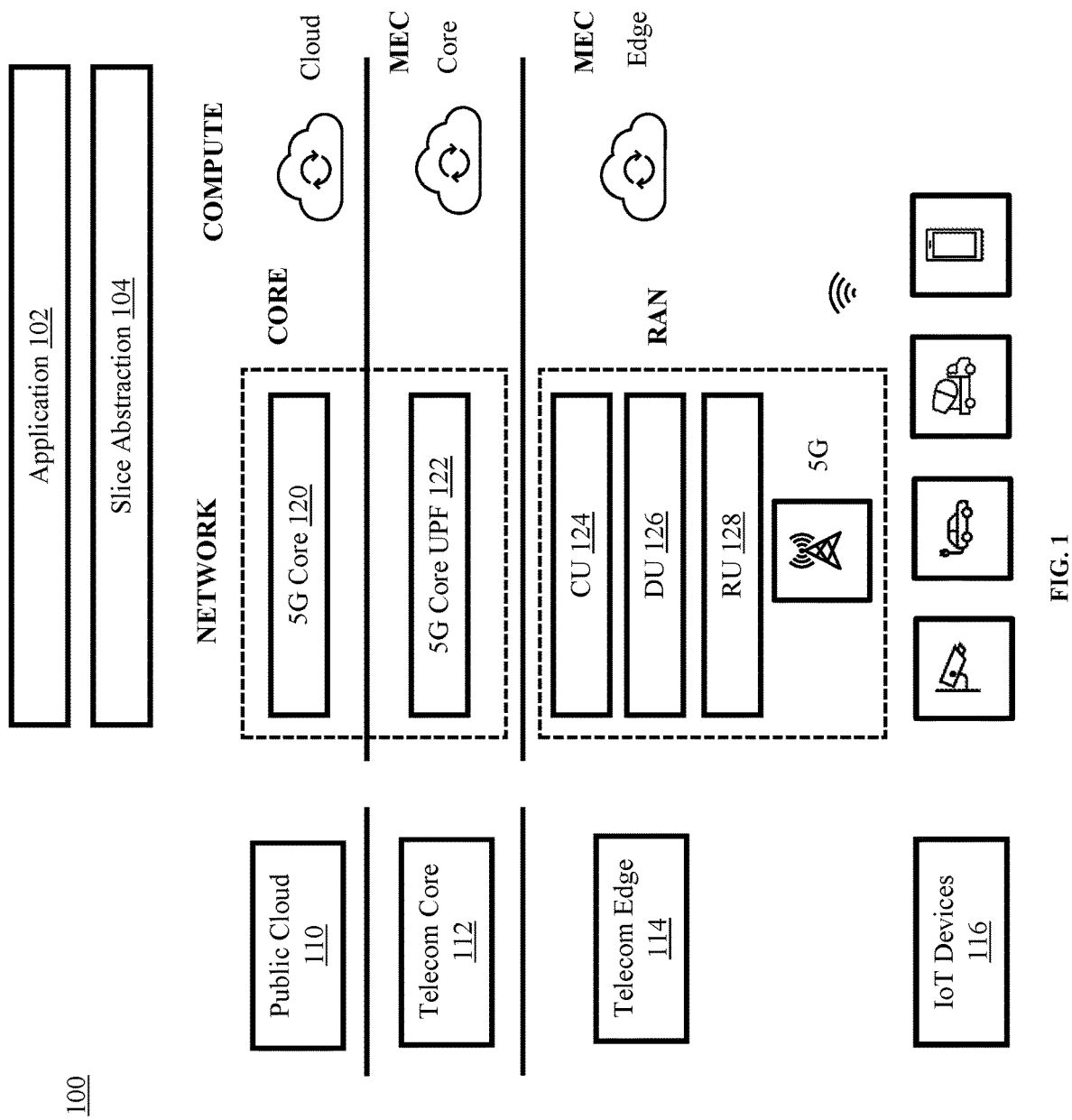
FIG. 1 is a block/flow diagram of an exemplary multi-tiered compute and network fabric or environment, in accordance with embodiments of the present invention.

FIG. 1 depicts such a multi-tiered compute and network fabric or environment 100. A slice abstraction 104 is on top of the compute and network infrastructure and the application 102 uses this slice abstraction 104 to request network as well as compute slices. Moreover, the underlying infrastructure components are untouched by the application 102. All requests for compute and network slices always go through the slice abstraction 104, which may grant or deny requested slices depending on the resource conditions and demands at that time. In such a multi-tiered architecture 100, compute is available at various tiers like devices, i.e., where data is produced, edge and in the cloud. Similarly, different kinds of networking capabilities are available at different tiers, e.g., 5G connectivity between devices and edge servers (120, 122 in the public cloud 110 and telecom core 112, respectively), Metropolitan Area Network (MAN) between distributed edge resources and Wide Area Network (WAN) between edge and central cloud. In a Regional Area Network (RAN), networking capabilities include Centralized Unit (CU) 124, Distributed Unit (DU) 126, and Radio Unit (RU) 128 in the telecom edge 114.

Deploying and optimizing applications in such a complex infrastructure is challenging. Moreover, the real-time state of different resources (e.g., available network and compute) is highly dynamic due to high variability in the compute (multi-tenancy, heterogeneity, etc.), and changing network (5G NR interference, link congestion, packet loss, etc.) conditions. Therefore, the problem of application deployment and optimization across multi-tiered compute and network fabric or environment is even more challenging considering the real-time state of resources for IoT devices 116.

Figure 2:
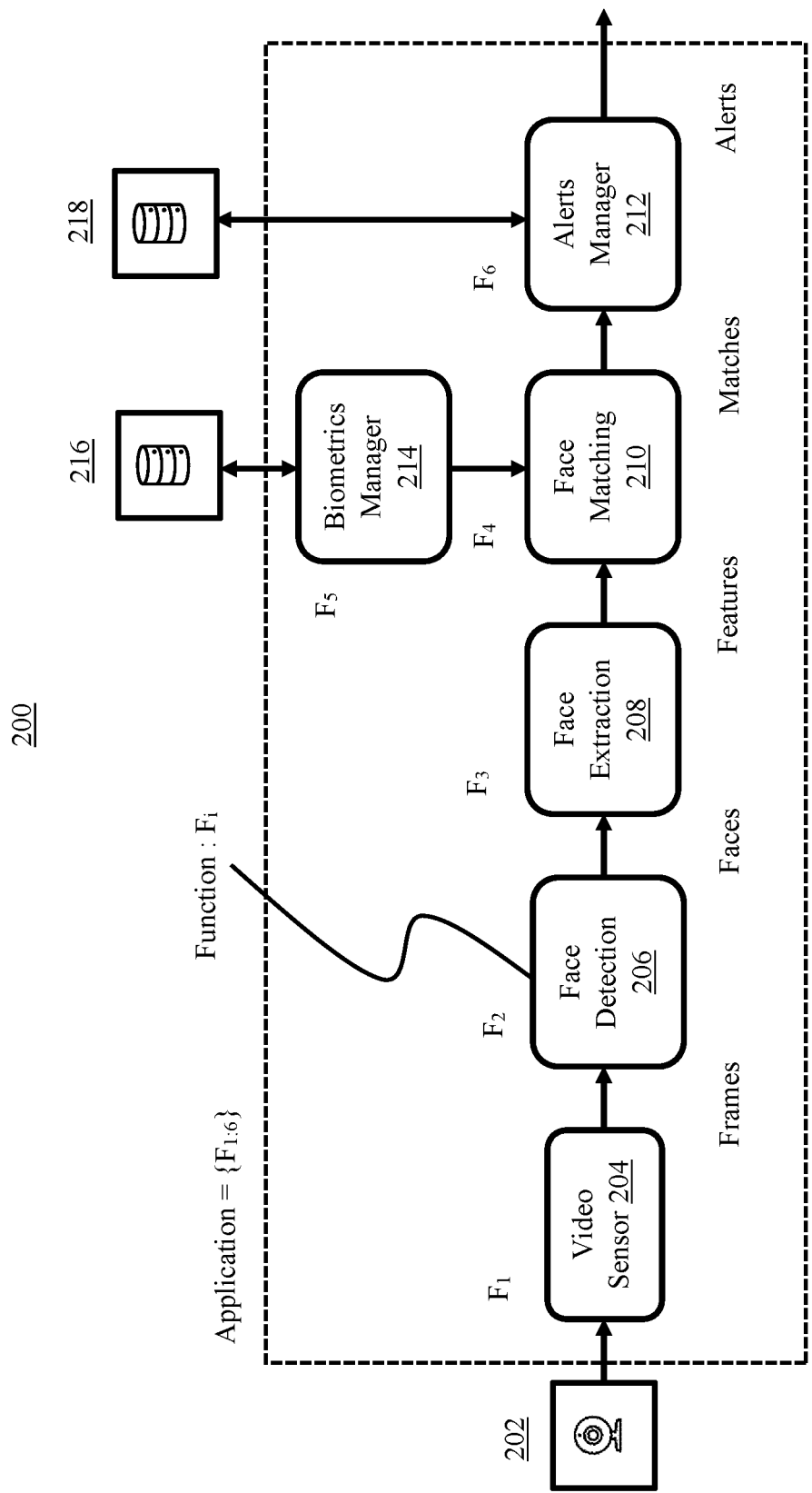
FIG. 2 is a block/flow diagram of exemplary video surveillance system.

For an application which includes multiple individual microservices, that is, functions, deployment of the application 102 entails deployment of individual functions and management of data communication between various functions. FIG. 2 depicts the pipeline 200 of such a microservices-based watchlist application, for a video surveillance use case. Each individual function for this application has demands for different resources such as compute, storage, bandwidth for the incoming streams, etc. The overall performance of the application depends on the allocated resources to all the microservices. This introduces a coupling relationship between the usage of different resources and the application performance. Incorporating these coupling relationships to optimally allocate resources to the functions of microservices-based 5G applications is novel. Referring back to FIG. 2, a camera 202 employs a video sensor 204 to detect a face via a face detection component 206 and extracts faces from the video via a face extraction component 208. A face matching component 210 is employed to find matches between the faces in the captured videos and faces stored in a database 216 managed by a biometrics manager 214. If a match is verified, an alerts manager component 212 issues a notification or alert. Such matches can be stored in a face matching database 218.

Figure 4:
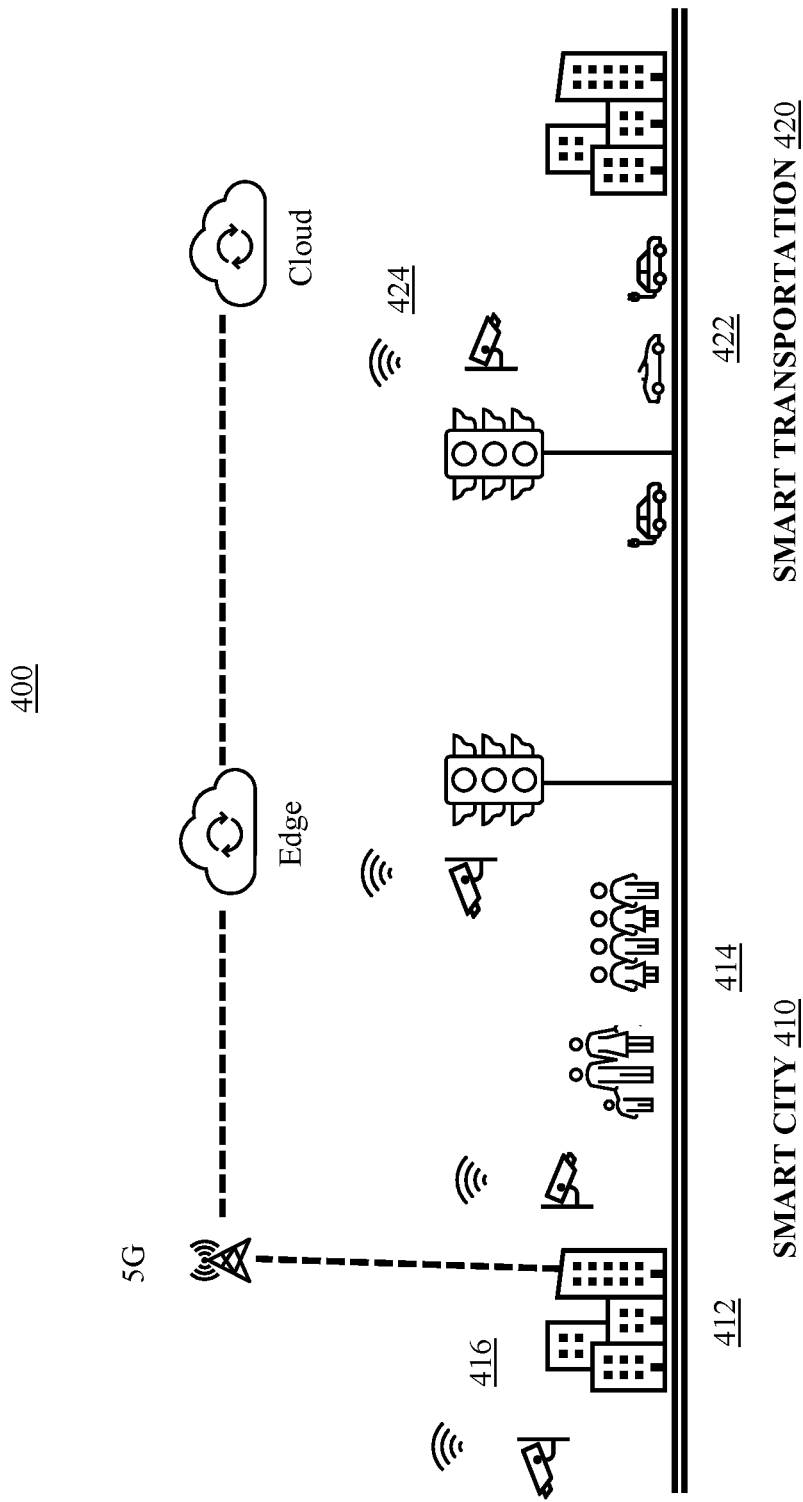
FIG. 4 is a block/flow diagram illustrating a city-scale IoT sensor deployment system.

A multi-tiered infrastructure opens several possibilities for the deployment of functions and inter-connections between them. Thus, the questions of where (e.g., which compute node or tier) each individual function is deployed at and how the communication between functions is realized, considering the resource coupling relationships, are open research problems. The placement decisions directly impact the bottom line for the application, e.g., end-to-end application latency, accuracy, cost of resource usage or any other application-level metric. Therefore, proper function level resource allocation and automatically adjusting function-level resources in response to changes in the dynamic infrastructure are important for meeting application-level requirements. The resource allocation problem becomes even more severe at a large-scale deployment e.g., city-scale 400 as shown in FIG. 4, when there are hundreds to thousands of IoT sensors, each continuously producing data streams, which need to be transmitted over 5G for local/remote processing. In such scenarios, managing function-level resources for processing all such data streams in a dynamic environment is a challenging task.

The exemplary methods aim to automatically manage the execution of microservices-based applications on a dynamic, heterogeneous, multi-tiered compute fabric or environment in a 5G network by considering the coupling relationships between resources, when only application-level requirements are given, without knowing individual function-level requirements. The exemplary methods first identify and model the coupling between network and compute resources and analyze the impact of the coupling on application performance by considering multiple real-world use cases. Then, the exemplary methods employ an optimization formulation that captures the compute and network coupling relationships and enable a principled consideration of resource allocation options to significantly reduce network and compute resource usage. The proposed runtime system (referred to as ROMA) uses the new formulation and utilizes the coupling to jointly optimize compute and network resources across different compute and network slices while ensuring consistent, high-quality insights.

ROMA thus performs resource orchestration for microservices-based 5G applications in a dynamic, heterogeneous, multi-tiered compute and network fabric. It is assumed that only application-level requirements are known, and the detailed requirements of the individual microservices in the application are not specified. As part of the solution, ROMA identifies and leverages the coupling relationships between compute and network resources for various microservices and solves an optimization problem to appropriately identify how each microservice should be deployed in the complex, multi-tiered compute and network fabric or environment, so that the end-to-end application requirements are optimally met.

ROMA is implemented to two real-world IoT applications in a video surveillance domain (FIG. 2) and an Intelligent Transportation System (ITS) domain (FIG. 3) to show that ROMA can improve resource usage significantly (e.g., saves up to 90% compute resource usage and saves up to 95% network resource usage), while maintaining quality of insights, compared to a static resource allocation approach that ignores compute and network resource usage coupling.

Figure 3:
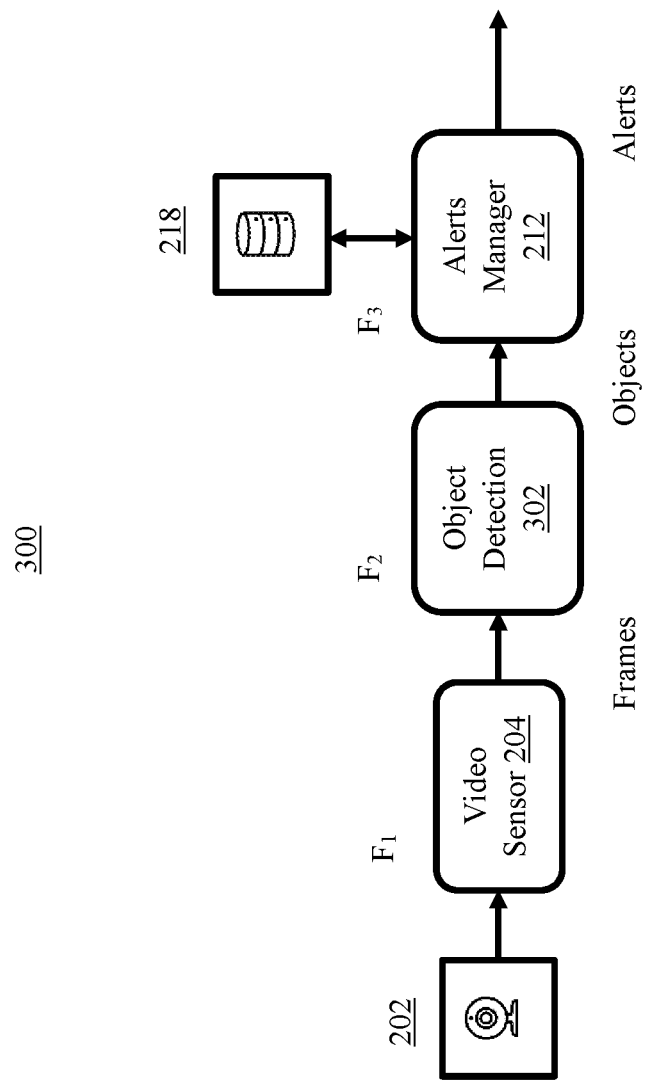
FIG. 3 is a block/flow diagram of an exemplary intelligent transportation system.

FIG. 2 depicts the structure of the video surveillance system 200, i.e., watchlist application, which uses face recognition technology to identify individuals seen by a camera. FIG. 3 depicts an object detection application 300, which is used in ITS to detect objects like cars and even people, e.g., pedestrians, and build higher-level applications such as accident prevention, safety alerting, traffic control, etc. In FIG. 3, the camera 202 employs a video sensor 204 to detect objects via object detection component 302. An alerts manager 212 can also be used to send alerts or notifications of object detection. Such detected objects can be stored in database 218.

The main challenges while designing ROMA are addressed below.

The first challenge is identifying the resource coupling relationship and its impact on the application performance. The performance of a microservices-based application is controlled by the number of different resources used by different microservices. These coupling relationships are not only application-specific, but also time-variant. Ignoring this important phenomenon in the application resource orchestration phase may result in huge resource overprovisioning and undesirable performance. While the resource coupling relationships can be non-linear in general, the exemplary methods use linear regression to model the application performance as a function of the allocated resources.

The second challenge is the unknown function-level performance requirements. In a multi-tiered 5G infrastructure, the decisions on the placement of application functions and the resource allocations determine the application-level performance metrics such as end-to-end latency, throughput, accuracy, etc. While knowing the functions-level requirements simplifies the deployment process, in a realistic setup, only application-level requirements are known. The exemplary methods introduce an optimization model with function placement and resource allocation decision variables, and the application-level performance requirements are modeled as hard constraints.

The physical infrastructure includes computing nodes distributed across multiple layers, at the edge and at a central cloud. In FIG. 4, the nodes can be a building 412, people 414, cars 422, etc., employed in a smart city 410 having smart transportation 420. Cameras communicate (416, 424) with the cloud and the edge. At each compute tier, compute slicing is possible for the allocation of the resources to different applications. Let $\mathcal{M}$ represent the set of compute nodes. Each compute node $m \in \mathcal{M}$ is specified by ($g_m$, $tier_m$), where $g_m$ and $tier_m$ denote the available resource vector and the associated tier (e.g., IoT device, far edge, near edge, central cloud), respectively. Assuming that each node m provides T different resources represented by set $\mathcal{T}$, the size of $g_m$ is T. While the proposed approach can be easily extended to an arbitrary set of resources, the exemplary methods consider network and compute resources, i.e., $\mathcal{T} = \{com, net\}$.

An application is modeled as a set of microservices or functions and interconnections that represent the data dependency between functions. An application is specified by a tuple $\mathcal{R} = (\tau, \omega)$, where $\tau$ and $\omega$ stand for the required end-to-end delay and throughput of the application, respectively. Let G=(V, E) be the graph representing the application, where V denotes the set of application functions and E represents the interconnections between functions.

Furthermore, $\mathcal{R}_v = (\tau_v, \omega_v)$ denotes the portion of the delay and throughput corresponding to node (function) v. Moreover, $tier^v$ denotes the tier on which function v should run if such constraints exist for function v. For instance, there might exist constraints on some functions of the mobile application (such as in user-initiated applications) to run locally (on the user equipment). Given the function level performance metrics $\{\mathcal{R}_v, v \in V\}$, it is assumed that the rules defining the application-level performance metrics are known.

One challenge in this regard is to determine the set of functions contributing to each of the end-to-end application performance metrics (that is, the critical path or pipeline of the application). For the sake of simplicity, it is assumed that the knowledge about the contributing functions to each performance metric is available by the application developer. For instance, given the functions of the critical path of G as $V_{critical} \in V$, the end-to-end application delay can be calculated as $h_{delay}(\tau_1, \ldots, \tau_{|V|}) = \Sigma_{v \in V_{critical}} \tau_v$.

Similarly, the throughput rule is computed as $h_{throughput}(\omega_1, \ldots, \omega_{|V|}) = \min_{v \in V_{critical}} \omega_v$.

To successfully and optimally deploy an application given its end-to-end performance requirements, it is important to understand the coupling between the usage of different resources. Let p denote the desired application performance, e.g., p can be the detection accuracy in the watchlist application.

To address the impact of the network and compute resources on the application performance, the exemplary methods define $f_{v,v'}^{t,t'}(x,p): \mathbb{R} \to \mathbb{R}$, v, v'$\in$V, t, t'$\in$T as the minimum resource unit of type t' that should be allocated to function v' in order to achieve the application performance of p, given that x units of resource type t is allocated to function v.

In fact, $f_{v,v'}^{t,t'}(.,.)$ reflects the coupling relationship between each pair of resources allocated to all pairs of application functions. Even for the same function, that is, when v=v', a coupling relationship between different types of resources is reflected through the defined function as well. For instance, given that the input streams of function $F_2$ of the watchlist application in FIG. 2 consume x Mbps network, the minimum number of CPU cores that should be allocated to $F_2$ to achieve an accuracy of p is equal to $f_{2,2}^{net,com}(x,p)$.

The application deployment problem is modeled across a multi-tiered compute and network fabric or environment as an optimization problem. The usage of different models for the coupling relationships is then presented.

Regarding optimizing resource allocation and application performance, the application resource allocation and performance optimization problem entails the assignment of microservices to the compute nodes in $\mathcal{M}$ (e.g., placement problem) and the allocation of different resources to each function, such that end-to-end application requirements (e.g., delay and throughput) are satisfied. This problem is modeled as a multi-objective optimization problem, with the objective of minimizing the total resource usage (equivalently, the deployment cost) and maximizing the application performance, by incorporating the resource coupling functions. By designing a joint optimization problem with two objective terms, the tradeoff between performance and resource usage can be illustrated.

The following decision variables are defined for the problem formulation:

$x_{v,m}$ is a binary decision variable for function placement which is equal to 1 if the function v of the application is assigned to the substrate node m for execution and 0 otherwise.

$y_{v,m}^t$ is a continuous decision variable denoting the amount of resource type t of node m allocated to function v.

p is a continuous decision variable representing the application performance, e.g., the face recognition accuracy or object detection score.

The resulting optimization problem is given as follows:

$$[P] \min \eta \sum_{t,v,m} y_{v,m}^t - (1-\eta)p$$

s.t.

$$\sum_m x_{v,m} f_{v,v'}^{t,t'}(y_{v,m}^t, p) \leq \sum_m x_{v',m} y_{v',m}^{t'}, \forall v, v', t, t'$$

$$y_{v,m}^t \leq g_m^t x_{v,m}, \forall t, m, v$$

$$\sum_{v \in V} y_{v,m}^t \leq g_m^t, \forall t, m$$

$$\sum_{m | tier^v = tier_m} x_{v,m} = 1, \forall v$$

$$\tau \geq h_{delay}(\tau_1, \ldots, \tau_{|V|})$$

$$\omega \leq h_{throughput}(\omega_1, \ldots, \omega_{|V|})$$

$$x_{v,m} \in \{0, 1\}, \forall v \in V, m \in \mathcal{M}$$

$$0 \leq y_{v,m}^t \leq g_m^t, \forall v \in V, m \in \mathcal{M}, t \in \mathcal{T}, 0 \leq p \leq p_{max}$$

In the objective function, η is a parameter between 0 and 1 used to control the balance between the two objective terms. In experiments, different values for η were tested and a small value was selected to promote a solution that primarily enhances the performance and minimizes the total consumed resources. The constraints above ensure that the resources allocated to each application microservice is greater than or equal to the required minimum amount (given by the defined coupling functions) to potentially achieve the performance of p.

For instance, the resource type t' allocated to function v' which is equal to $\sum_m x_{v',m} y_{v',m}^{t'}$ should be greater than or equal to $\sum_m x_{v,m} f_{v,v'}^{t,t'}(y_{v,m}^t, p)$ for all t, v. This constraint together with the objective of minimizing total used resources results in a solution which avoids resource overprovisioning.

The set of inequalities $y_{v,m}^t \leq g_m^t x_{v,m}$, $\forall t, m, v$ and $$\sum_{v \in V} y_{v,m}^t \leq g_m^t, \forall t, m$$

enforce the infrastructure capacity constraints.
Constraint $$\sum_{m | tier^v = tier_m} x_{v,m} = 1, \forall v$$

ensures that each function of an application is deployed at one infrastructure node. The application end-to-end performance requirements are guaranteed by constraints τ and ω.

Finally, the domain constraints are expressed, where $p_{max}$ is the maximum observed performance for a specific application in all resource allocation vectors. The optimization problem [P] is a Mixed Integer Nonlinear Program (MINLP) owning to the constraints and the integer variables, thus an $\mathcal{NP}$-hard problem.

Now the models for the coupling functions are presented and solved for a special case of [P]. Regarding modelling the resource coupling relationships, different models that can be used for the coupling functions are described.

The first one is a linear regression modeled as:

$$f_{v,v'}^{t,t'}(y_{v,m}^t, p) = \alpha_{v,v'}^{t,t'} y_{v,m}^t + \beta_{v,v'}^{t,t'} p + \gamma_{v,v'}^{t,t'}$$

The parameters $\alpha_{v,v'}^{t,t'}$, $\beta_{v,v'}^{t,t'}$, $\gamma_{v,v'}^{t,t'}$ are obtained using the historical data collected in an offline manner. It is important to note that while linear regression is employed for modelling resource couplings, it is possible to use other models such as a Support Vector Regressor (SVR) or a Multilayer Perceptron (MLP) resulting in better prediction performance. However, the benefit of linear regression models is that if the placement variables $x_{v,m}$ are assumed to be known, the resource allocation problem [P] becomes a Linear Program (LP) for which efficient algorithms exist to generate the optimal solution in polynomial time.

Figure 5:
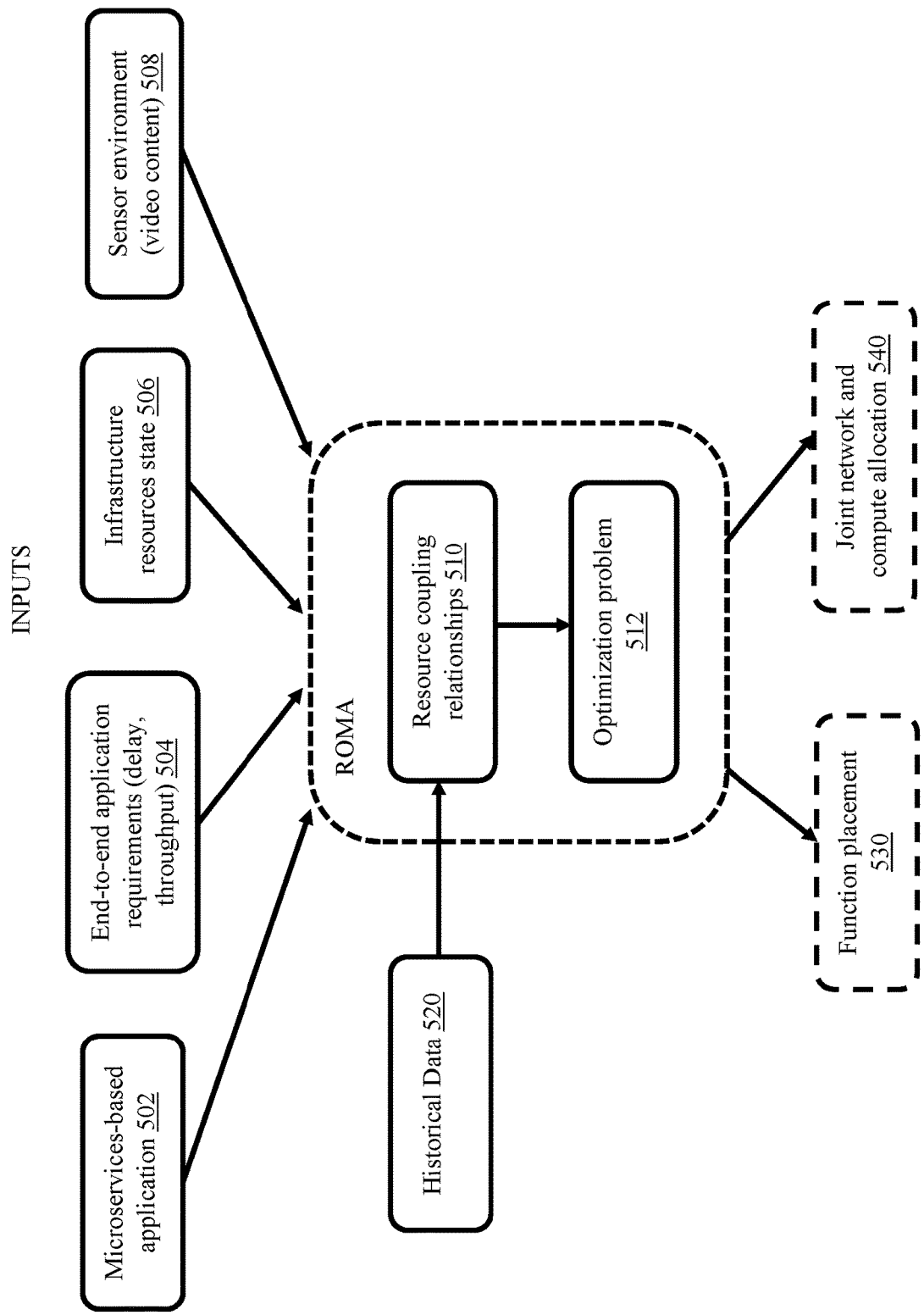
FIG. 5 is a block/flow diagram of an exemplary Resource Orchestration for Microservices-based 5G Applications (ROMA), in accordance with embodiments of the present invention.

FIG. 5 is a block/flow diagram of an exemplary Resource Orchestration for Microservices-based 5G Applications (ROMA), in accordance with embodiments of the present invention.

The inputs of ROMA are the application structure 502, the end-to-end application requirements 504, the state of the infrastructure resources 506, and the camera environment/video content 508. The coupling functions derived from the coupling relationships 510 are derived using historical data 520 collected for a specific application and then used in an optimization problem 512. The optimization model has three set of variables, a set of binary variables for function placement decision, a set of continuous variables for the allocation of resources to each function, and a single continuous variable denoting the performance of the application. The goal of ROMA is to minimize the total used resources and maximize performance, thus the problem is a multi-objective optimization. The application requirements, the coupling relationships and the infrastructure resource limitations are modeled as hard constraints. The final problem for both function placement 530 and resource allocation 540 is a Mixed Integer Linear Program (MILP) for which commercial solvers such as CPLEX and GLPK can be used. Moreover, if the placement decisions are given, the resource allocation problem becomes a Linear Program (LP) with efficient solution. By solving the designed MILP, the optimal joint network and compute resource allocation and the function placement decisions are derived.

Figure 6:
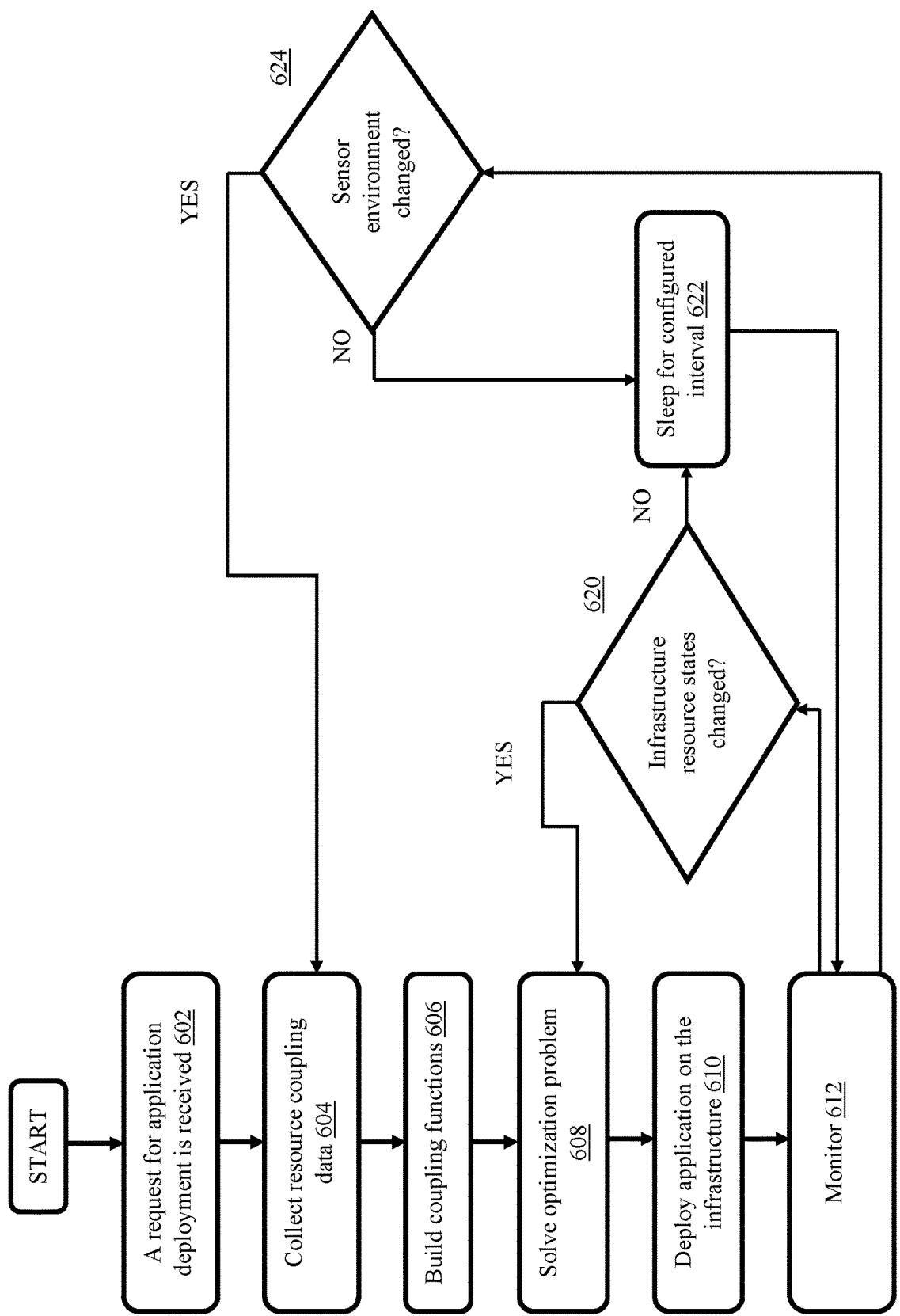
FIG. 6 is a block/flow diagram of an exemplary flowchart of the resource orchestration for microservices-based 5G applications, in accordance with embodiments of the present invention.

FIG. 6 is a block/flow diagram of an exemplary flowchart of the resource orchestration for microservices-based 5G applications, in accordance with embodiments of the present invention.

The flowchart of ROMA is for a specific application during its runtime. When a request for an application deployment is received 602, resource coupling data 604 is collected. Based on the collected data 604, coupling functions 606 are built. The coupling functions 606 are used in the optimization problem designed and solved (608) to obtain the optimal microservices placement and resource allocation decisions. Then, the application is deployed (application deployment 610) on the infrastructure and monitored (612). If the state of the resources changes (620), the optimization problem is resolved. Moreover, if the sensor environment changes (624), new data is collected and coupling functions are rebuilt. if the sensor environment does not changes and the infrastructure resource states do not change, then the process proceeds to 622 where a pause (or sleep) occurs for the configured interval.

The features of the invention include at least a system and method to optimally place various microservices of a microservices-based application and allocate network and compute resources in a multi-tiered compute and network fabric, using resource coupling relationships obtained from historical data. The system and method determine a coupling relationship between compute and network resources for microservices based application. The system and method leverage compute and network coupling relationship to optimize application resource usage. The system and method further reduce overall resource usage and maximize the application performance while satisfying application end-to-end latency and throughput. The system and method also capture internal knowledge about the application's microservices, their inter-connections, and the critical microservices pipelines that determine the end-to-end latency and throughput of the application and leverage it within a runtime to meet application requirements. Moreover, the system and method model the application as a graph with vertices being microservices and edges representing communication between microservices and determine total used resources for running the application in the multi-tiered network and compute fabric. The system and method further dynamically monitor application's microservices and determine optimal placement and resource allocation based on the current compute and network conditions and camera sensor environment. The system and method deploy the application in the multi-tiered architecture instead of single-tiered MCC-only and MEC-only architectures and apply the programming model and runtime for video analytics applications.

In conclusion, emerging IoT applications today have strict and diverse set of requirements in terms of end-to-end latency, throughput, reliability, etc. 5G and edge computing has made it possible to meet these requirements. However, with the addition of extra computing and networking layers, the underlying infrastructure itself has become quite complex. To this end, the exemplary methods introduce ROMA, which enables optimal resource orchestration for microservices-based 5G applications in a dynamic, heterogeneous, multi-tiered compute and network fabric by exploiting resource coupling relationships. ROMA can successfully map application-level requirements to individual functions and ensure optimal deployment, such that end-to-end application requirements are met. By implementing two real-world IoT applications, one in the video surveillance domain (FIG. 2) and another in the Intelligent Transportation System (ITS) domain (FIG. 3), it is shown that ROMA can reduce compute and network resource usage remarkably while maintaining the application performance.

Figure 7:
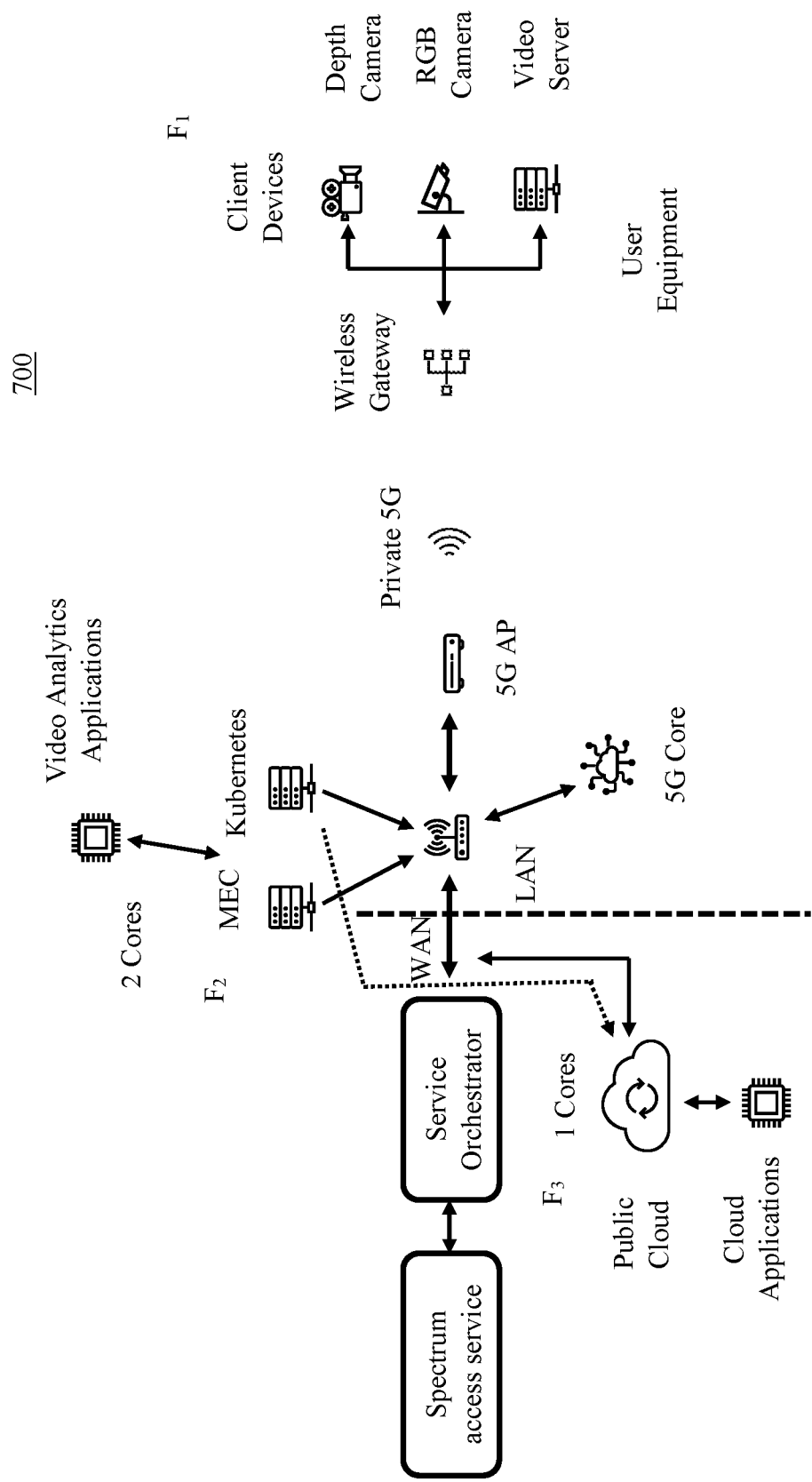
FIG. 7 is an exemplary practical application for the resource orchestration for microservices-based 5G applications, in accordance with embodiments of the present invention.

FIG. 7 is an exemplary practical application 700 for the resource orchestration for microservices-based 5G applications, in accordance with embodiments of the present invention.

In one practical example, User Equipment (UE) connect over private 5G to Access Point (AP). 5G core and MEC servers are in the internal Local Area Network (LAN) and the core is remotely configured using, e.g., Celona's Service Orchestrator. Control and data plane traffic from the AP is terminated at the core. In the MEC setup, there is one master and three worker node servers. The master node is equipped with 10-core Intel core i9 CPU and the three worker nodes are equipped with 24-core Intel CPU and with NVIDIA RTX 2080 Ti GPUs. A Kubernetes cluster is setup on the MEC servers and both of the use cases, i.e., video surveillance (watchlist application) (FIG. 2) and intelligent transportation systems (object detection application) (FIG. 3) run within pods in Kubernetes. Each function runs as a separate pod and multiple replicas of these pods are created, as necessary. The videos are streamed from the video server using ffmpeg and they are processed in MEC servers on a Kubernetes cluster, within pods. The GNU Linear Programming Kit (GLPK) solver can be used for the optimization problem.

Regarding video surveillance, the exemplary methods consider a sample video including different people and compare the performance of two resource allocation strategies, ROMA and a static allocation in which the amount of compute allocated to the face detection function is fixed to 2 cores. The results are averaged over, e.g., 3 runs. It is observed that compared to the static resource allocation scheme, ROMA can reduce the compute resource usage up to 90%, hence preventing overprovisioning while maintaining the application accuracy, by exploiting the network-compute coupling relationship.

Regarding the ITS, the goal is to detect the person or car objects in the videos. Since not all the video frames are processed at each experiment instance, and because the number of objects differ in various video frames, the following weighted score is defined (which is different from confidence score) for the object detection application:

$$\text{score} = \sum_{f \in FRAME} \omega f \frac{TP_f}{GT_f}$$

where f, $TP_f$ and $GT_f$ denote the frame index, the number of true positives in frame f and the number of ground truth objects in frame f. Moreover, FRAME denotes the set of processed frames. The exemplary methods use the Intersection Over Union (IoU) metric to measure the overlap between the detected and ground truth bounding boxes. The IoU threshold is predefined as 0.5 and the predictions with an IoU of 0.5 and above are classified as TP. It is observed that ROMA outperforms the static scheme in terms of compute resource usage by saving up to 95% of the network bandwidth (in the case that the available number of CPU cores is 1), while the object detection score is comparable with the overprovisioned static solution.

Figure 8:
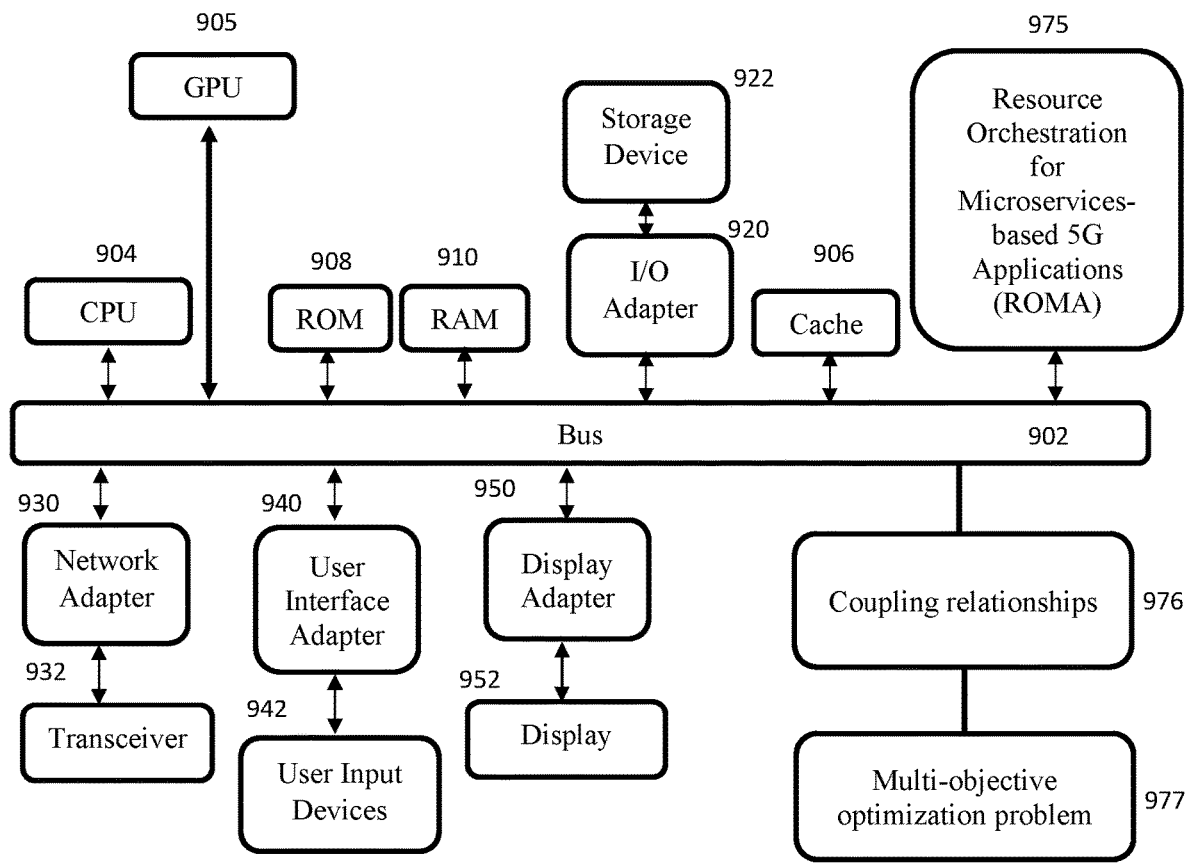
FIG. 8 is an exemplary processing system for the resource orchestration for microservices-based 5G applications, in accordance with embodiments of the present invention.

FIG. 8 is an exemplary processing system for the resource orchestration for microservices-based 5G applications, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, the Resource Orchestration for Microservices-based 5G Applications (ROMA) 975 employs coupling relationships 976 and a multi-objective optimization problem 977.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
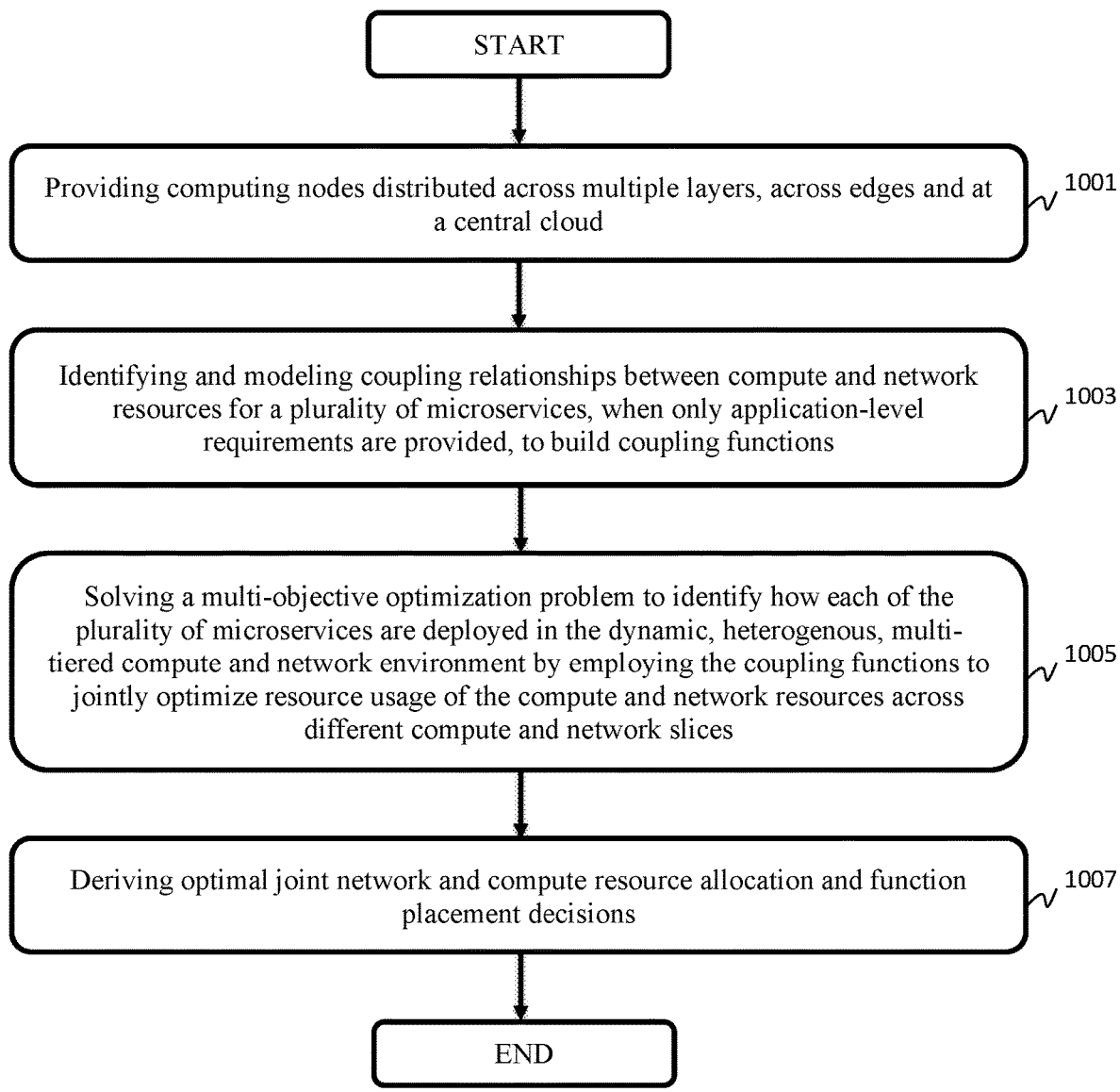
FIG. 9 is a block/flow diagram of an exemplary method for the resource orchestration for microservices-based 5G applications, in accordance with embodiments of the present invention.

FIG. 9 is a block/flow diagram of an exemplary method for the resource orchestration for microservices-based 5G applications, in accordance with embodiments of the present invention.

The compute requirements and network requirements of a microservices-based application are managed jointly by:

At block 1001, provide computing nodes distributed across multiple layers, across edges and at a central cloud.

At block 1003, identify and model coupling relationships between compute and network resources for a plurality of microservices, when only application-level requirements are provided, to build coupling functions.

At block 1005, solve a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices.

At block 1007, derive optimal joint network and compute resource allocation and function placement decisions.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for performing resource orchestration for microservices-based 5G applications in a dynamic, heterogenous, multi-tiered compute and network environment, the method comprising:
    managing compute requirements and network requirements of a microservices-based application jointly by:
        positioning computing nodes distributed across multiple layers, across edges and at a central cloud;
        identifying and modeling coupling relationships between compute and network resources for a plurality of microservices, when only application-level requirements are provided, to build coupling functions;
    solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices; and
    deriving optimal joint network and compute resource allocation and function placement decisions.

2. The method of claim 1, wherein inputs to the resource orchestration include application structure, end-to-end requirements, a state of infrastructure resources, and camera environment or video content.

3. The method of claim 1, wherein the coupling functions are derived from historical data collected for a specific microservices-based application.

4. The method of claim 1, wherein the multi-objective optimization problem includes a set of binary variables for function placement decision, a set of continuous variables for allocation of resources to each function, and a single continuous variable denoting performance of the microservices-based application.

5. The method of claim 1, wherein solving the multi-objective optimization problem further enables reduction in overall usage and maximization of performance while satisfying application end-to-end latency and throughput.

6. The method of claim 1, wherein the coupling relationships and limitations of the compute and network resources are modeled as hard constraints.

7. The method of claim 1, wherein the multi-objective optimization problem is a mixed integer nonlinear program (MINLP).

8. A non-transitory computer-readable storage medium comprising a computer-readable program for performing resource orchestration for microservices-based 5G applications in a dynamic, heterogenous, multi-tiered compute and network environment, wherein the computer-readable program when executed on a computer causes the computer to perform the steps of:
    managing compute requirements and network requirements of a microservices-based application jointly by:
        positioning computing nodes distributed across multiple layers, across edges and at a central cloud;
        identifying and modeling coupling relationships between compute and network resources for a plurality of microservices, when only application-level requirements are provided, to build coupling functions;

solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices; and deriving optimal joint network and compute resource allocation and function placement decisions.

9. The non-transitory computer-readable storage medium of claim 8, wherein inputs to the resource orchestration include application structure, end-to-end requirements, a state of infrastructure resources, and camera environment or video content.

10. The non-transitory computer-readable storage medium of claim 8, wherein the coupling functions are derived from historical data collected for a specific microservices-based application.

11. The non-transitory computer-readable storage medium of claim 8, wherein the multi-objective optimization problem includes a set of binary variables for function placement decision, a set of continuous variables for allocation of resources to each function, and a single continuous variable denoting performance of the microservices-based application.

12. The non-transitory computer-readable storage medium of claim 8, wherein solving the multi-objective optimization problem further enables reduction in overall usage and maximization of performance while satisfying application end-to-end latency and throughput.

13. The non-transitory computer-readable storage medium of claim 8, wherein the coupling relationships and limitations of the compute and network resources are modeled as hard constraints.

14. The non-transitory computer-readable storage medium of claim 8, wherein the multi-objective optimization problem is a mixed integer nonlinear program (MINLP).

15. A system for performing resource orchestration for microservices-based 5G applications in a dynamic, heterogenous, multi-tiered compute and network environment, the system comprising:

a memory; and one or more processors in communication with the memory configured to:

manage compute requirements and network requirements of a microservices-based application jointly by:

positioning computing nodes distributed across multiple layers, across edges and at a central cloud;

identifying and modeling coupling relationships between compute and network resources for a plurality of microservices, when only application-level requirements are provided, to build coupling functions;

solving a multi-objective optimization problem to identify how each of the plurality of microservices are deployed in the dynamic, heterogenous, multi-tiered compute and network environment by employing the coupling functions to jointly optimize resource usage of the compute and network resources across different compute and network slices; and deriving optimal joint network and compute resource allocation and function placement decisions.

16. The system of claim 15, wherein inputs to the resource orchestration include application structure, end-to-end requirements, a state of infrastructure resources, and camera environment or video content.

17. The system of claim 15, wherein the coupling functions are derived from historical data collected for a specific microservices-based application.

18. The system of claim 15, wherein the multi-objective optimization problem includes a set of binary variables for function placement decision, a set of continuous variables for allocation of resources to each function, and a single continuous variable denoting performance of the microservices-based application.

19. The system of claim 15, wherein solving the multi-objective optimization problem further enables reduction in overall usage and maximization of performance while satisfying application end-to-end latency and throughput.

20. The system of claim 15, wherein the coupling relationships and limitations of the compute and network resources are modeled as hard constraints.

* * * * *